(No Model.)

C. BLACKWOOD.
Insect Trap.

No. 241,913. Patented May 24, 1881.

WITNESSES
John A. Ellis.
Philip C. Masi.

INVENTOR
Curtis Blackwood
by Anderson & Smith
his ATTORNEYS

UNITED STATES PATENT OFFICE.

CURTIS BLACKWOOD, OF GAINESVILLE, TEXAS.

INSECT-TRAP.

SPECIFICATION forming part of Letters Patent No. 241,913, dated May 24, 1881.

Application filed February 19, 1881. (No model.)

*To all whom it may concern:*

Be it known that I, CURTIS BLACKWOOD, a citizen of the United States, resident at Gainesville, in the county of Cooke and State of Texas, have invented certain new and useful Improvements in Insect-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
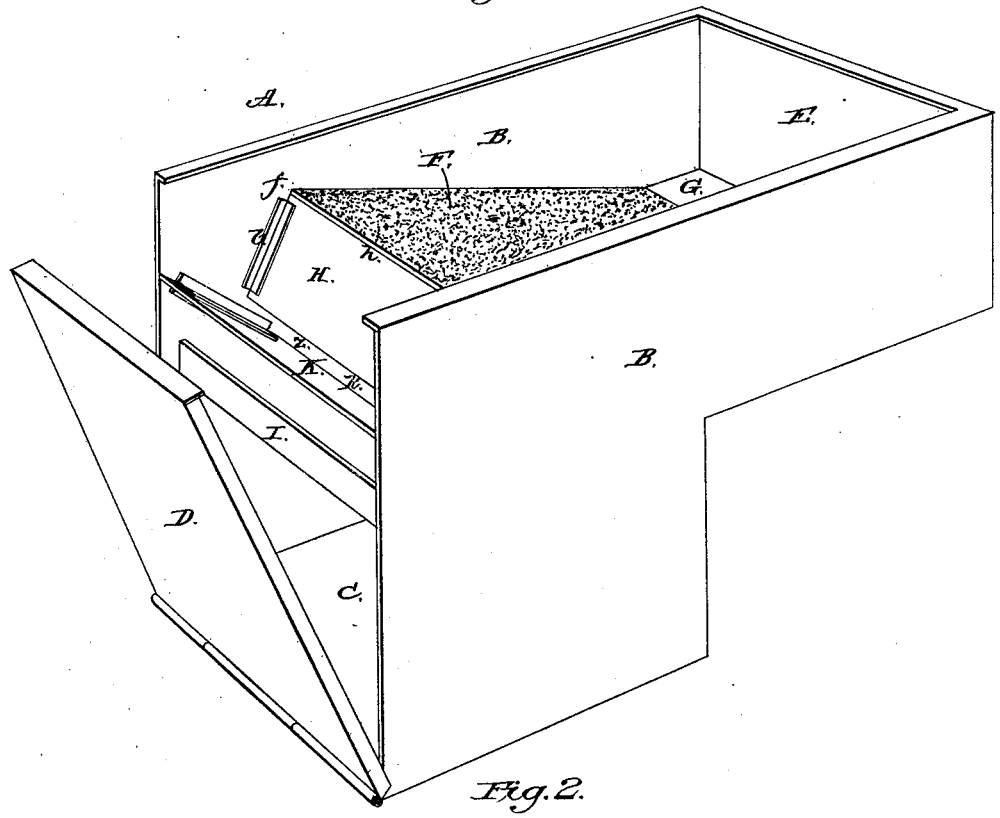
Figure 2:
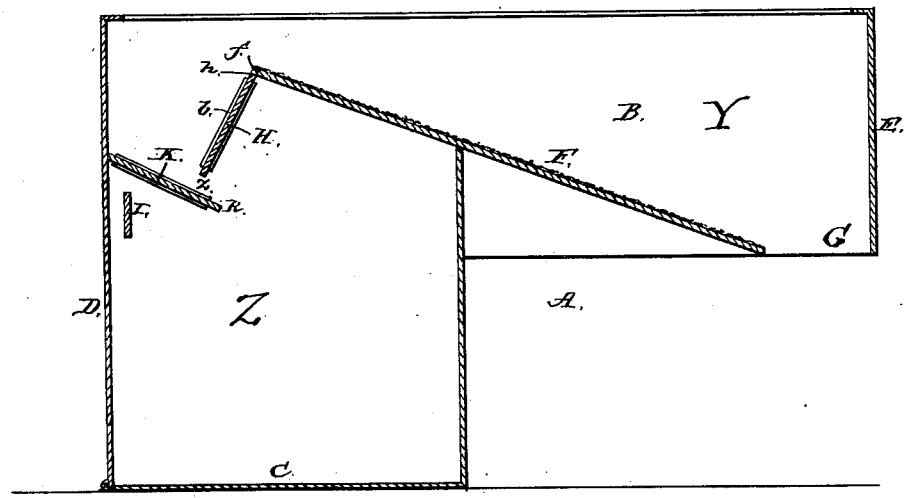

Figure 1 is a perspective view, and Fig. 2 is a sectional view.

This invention relates to ant-traps.

The invention consists in the construction hereinafter described, and particularly pointed out in the claim.

In the annexed drawings, A is a box, having the right-angled sides B B, the bottom C, hinged end D, and fixed end E, and open top. The body Z of this box is much deeper than the offset Y.

F is an incline, roughened on top, starting a short distance from end E, leaving a space, G, and, rising upward, ends some little distance from the top, and from hinged end D at $f$.

H is a piece of glass made fast between the sides B B, its edge $h$ held tight under the edge $f$ of incline F, said piece of glass slanting downward a short distance toward the hinged end D. This piece of glass is held at its ends in strips $b$ secured to the inside of sides B B.

I is a brace, running between sides B B at the hinged end D. Just above this brace there is secured between these sides a piece of glass, K, similar to piece H, also held in strips and slanting downward toward this latter piece, its lower edge, $k$, passing under that of piece H, leaving an opening, $z$, the two pieces and the sides thus forming a hopper. The upper edges of the box are turned in all around to prevent the ants crawling out that way.

The construction described furnishes a simple and cheap trap, one which can be made with little trouble and mechanical skill, well adapted to use in sections where ants abound and facilities for making traps are few. Being angular, its parts can readily and cheaply be renewed, especially the essential parts—the pieces of glass.

The shape of this trap is necessary for catching the hill ants—those whose houses project above ground.

The trap is placed by the mound, sitting on its bottom C, and with the opening G above the mouth of the nest. As the ants come out they will walk up the incline and drop down the pieces of glass into the body portion Z, where they may be disposed of in any manner.

I am aware that an ant or insect trap having roughened and slippery portions is not new; but the construction therein shown requires great skill in making, and if any of the parts are injured the trap would be ruined, since it could not be repaired except by a skilled mechanic, and not by an ordinary user, such as is found in sections of the country which these insects mostly infest.

I claim—

An ant-trap having its body portion deeper than the offset having the opening into the trap, as set forth.

In testimony whereof I affix my signature in presence of two witnesses.

CURTIS BLACKWOOD.

Witnesses:
 JOS. BURCH,
 R. F. BOSTICK.